United States Patent [19]
Holden

[11] B 3,918,255
[45] Nov. 11, 1975

[54] CERAMIC-LINED COMBUSTION CHAMBER AND MEANS FOR SUPPORT OF A LINER WITH COMBUSTION AIR PENETRATIONS

[75] Inventor: Abe N. Holden, Broomall, Pa.
[73] Assignee: Westinghouse Electric Corporation, Pittsburgh, Pa.
[22] Filed: July 6, 1973
[21] Appl. No.: 377,172
[44] Published under the Trial Voluntary Protest Program on January 28, 1975 as document no. B 377,172.

[52] U.S. Cl. ............................... 60/39.65; 431/352
[51] Int. Cl.² ........................................... F02C 1/00
[58] Field of Search ............ 60/39.65, 39.69, 200 A; 431/352, 353

[56] References Cited
UNITED STATES PATENTS

| | | | |
|---|---|---|---|
| 2,544,538 | 3/1951 | Mahnken et al. | 60/39.69 |
| 2,651,912 | 9/1953 | Abbott | 60/39.65 |
| 2,706,382 | 4/1955 | Logan et al. | 60/39.69 |
| 2,915,877 | 12/1959 | Darling | 60/39.69 |
| 3,321,922 | 5/1967 | Latto, Jr. | 60/200 A |
| 3,594,109 | 7/1971 | Penny | 60/39.65 |

*Primary Examiner*—Samuel Feinberg
*Attorney, Agent, or Firm*—F. A. Winans

[57] ABSTRACT

A gas turbine power plant metal combustion chamber cylinder is lined on its inside with two layers of ceramic material. The radially innermost layer is an interlocking, tile-like structure of dense ceramic material providing good thermal shock resistance. The intermediate layer which is disposed between the metal cylinder and the innermost layer is a low density ceramic material providing high thermal insulation. The layers of ceramic material are supported by ceramic tubes extending from the outer metal cylinder of the combustor through the intermediate wall and the inner wall. The tubes are also used to direct cooling air into the combustion chamber and increase the turbulence of the burning fuel and air within the chamber.

5 Claims, 10 Drawing Figures

CERAMIC-LINED COMBUSTION CHAMBER AND MEANS FOR SUPPORT OF A LINER WITH COMBUSTION AIR PENETRATIONS

BACKGROUND OF THE INVENTION

1. Field of the Invention

This disclosure relates generally to gas turbine engines, and more particularly, to combusion chambers having ceramic liners within the combusion chambers of gas turbine engines.

2. Description of the Prior Art

In gas turbines, fuel is burned continuously at peak cycle pressure in combination chambers to heat the air which will pass through the inlet nozzles and provide the motive force on the blades to rotate the turbine rotor. Combustion chambers or combustors, as they are sometimes called, are now being developed for temperatures of 2300° to 2500°F at their outlet end. The combustor inlet temperatures may be anywhere between 250°F to 1100°F. Metal combustors must be designed to avoid steep temperature gradients within their liners which would cause warping and cracking within the liner. Carbon deposits resulting from poorly combusted fuel may cause local hot spots and distortion of the liner and cause abrasion of the turbine blades.

The combustors, or combustion chambers, are injected with an atomized fuel by a nozzle in its upstream end. The ignition of the fuel takes place through the firing of a spark plug. Holes or louvers are disposed about the outer cylindrical containment in various zones, to be described later. The holes pass air into the combustor and over inner liner. The air then mixes with the burning fuel in a recirculating turbulent flow pattern. The fuel and air combustion continues in a space in which nearly stoichiometric fuel-air relations are maintained. The hot combustion products are mixed with additional air coming into the chamber through additional holes downstream in the combustor to dilute the hot motive fluid and to provide a suitable temperature profile at the turbine inlet.

Common construction in combustion chambers includes having a metal liner within a cylindrical casing. Air is forced over the surface of the liner and into a primary zone of combustion within the chamber, through holes, louvers, or slots, as described earlier. Additional air is forced over the liner to provide a film-cooling effect on the outer containment. This additional air is then forced into holes or louvers in a dilution zone to cause turbulence within the burning fuel-air mix, and provide a uniform temperature throughout, with no hot spots. However, poor penetration of the air in the combustion chamber does build up hot spots and allows the carbon deposits to form, which creates instability in the burning fuel within the chamber. This causes the buckling of the liner and the cracking in the combustor.

Some designers have improved combustion chambers by lining the walls of the combustion chamber with a ceramic material. This concept has led to heavy walls or liners to provide the desired thermal gradients therein. The use of heavy ceramic walls has also led to thermal shock, cracking and spalling in the high velocity combustion chamber gas stream, and it does not yield desired incandescent conditions with the inner wall of the combustor. The objects of the present invention are to overcome the problems of the prior art.

SUMMARY OF THE INVENTION

The present invention discloses a combustion chamber for gas turbines. The combustion chamber has a double walled ceramic liner within the combustor shell. The innermost wall portion of the liner is constructed from a plurality of interlocking high density ceramic plates or tile-like members capable of withstanding thermal shock, and capable of maintaining incandescence within the combustor. The intermediate wall portion, that wall between the outermost cylindrical shell of the combustor and the radially innermost wall of the liner is constructed of a low density insulating ceramic.

A plurality of tube-like passageways are disposed through the wall structure of the combustor. The tubes provide passageways for air for combustion and cooling, and they also act as retaining devices for the inner wall sections with respect to the outer combustor shell. The radially innermost wall members are slidably disposed about the radially inner end of the retaining air passageway tubes. The tubes may also have air foil vanes disposed across each of their ends to give a swirling motion to the incoming air. This swirling motion of the air aids penetration of the combustion flame by the dilution air, thereby obtaining more uniform temperature range at the combustor outlet.

BRIEF DISCUSSION OF THE DRAWINGS

DESCRIPTION OF THE PREFERRED EMBODIMENTS

Figure 1:
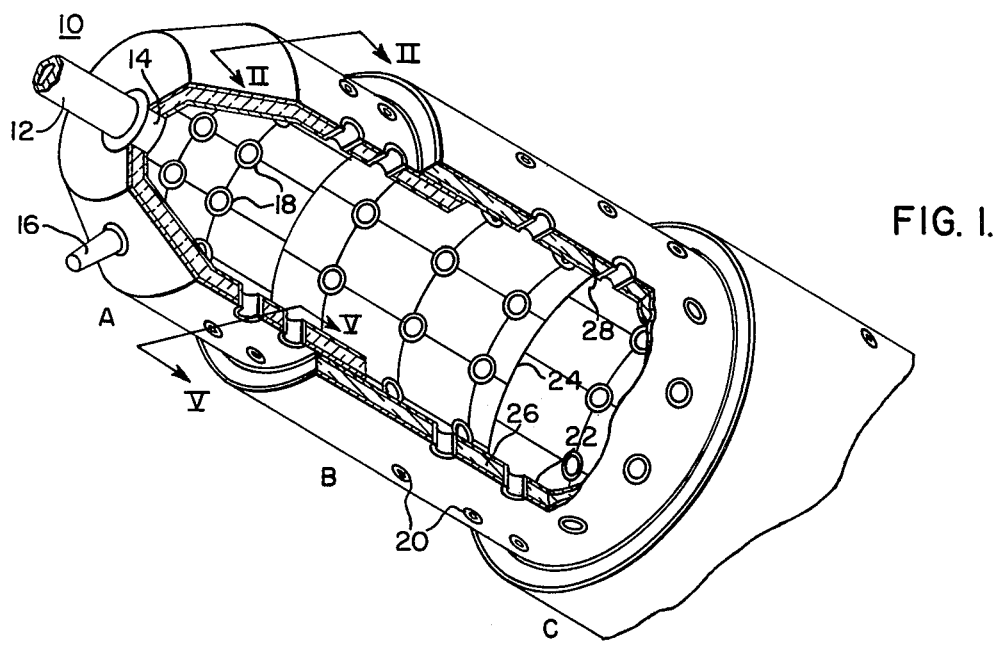
FIG. 1 is a partial perspective view of a gas turbine combustor.
Figure 1A:
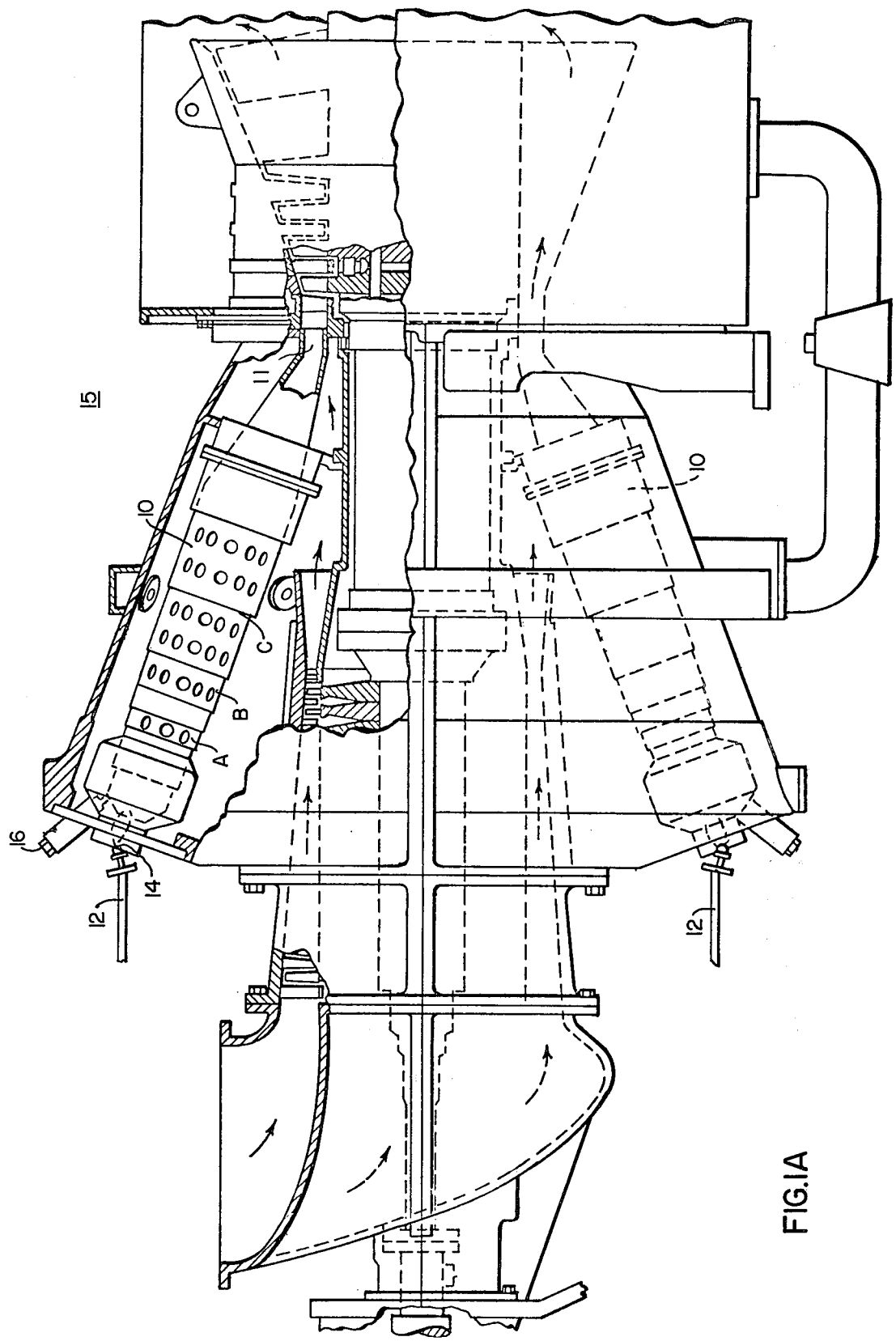
FIG. 1a is a partial sectional view of a gas turbine power plant having a plurality of combustors mounted thereon.

Referring to the drawings in detail, particularly to FIG. 1, there is shown a combustor, or combustion chamber 10. A plurality of the chambers 10 are disposed about the longitudinal axis of a gas turbine, and directed toward a group of inlet nozzles 11. An overall view of gas turbine 15 with the combustors 10 is shown in FIG. 1a.

The combustor 10 has a fuel supply duct 12 that feeds fuel to an atomizing nozzle 14. The atomizing nozzle 14 sprays fuel within the combustor 10 where it is ignited by a spark plug 16. The initial combustion occurs in a primary combustion zone indicated by the letter A in FIG. 1.

Air enters this primary zone A from a plurality of tube-like orifices or passageways 18 spaced about the zone A. The burning fuel and additional air entering through additional spaced tube-like passageways 20 combine in a downstream area called the dilution zone, indicated in FIG. 1 by the letter B. The combustion process in zone B is uniform due to the swirling motion of air caused by the jets of incoming diluting air through the passageways 20 in the dilution zone of the combustor 10. The flow of air and combusted fuel, otherwise called the hot motive fluid, passes into another zone C in FIG. 1, which is an outlet transition portion that directs the hot motive fluid into the nozzles 11 located in the gas turbine inlet region.

The high temperatures caused by the burning gas and air mixture, which may reach as high as 4000°F, are necessary to attain high efficiency and satisfactory power output from the turbine 15.

Figure 2:
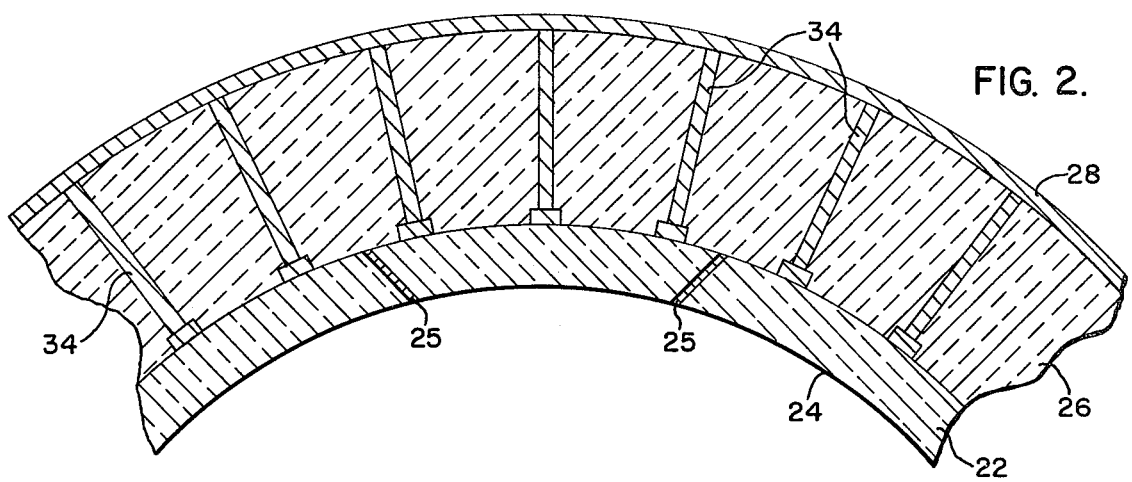
FIG. 2 is a view of a portion of the combustor wall taken along the lines II—II of FIG. 1.
Figure 3:
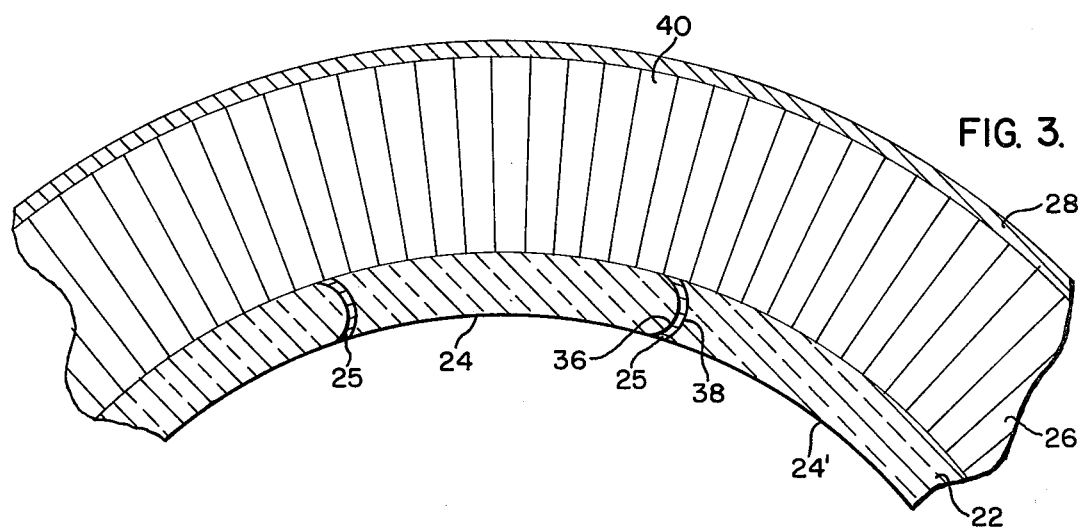
FIG. 3 is a view similar to FIG. 2, but showing a further embodiment of the invention.
Figure 4:
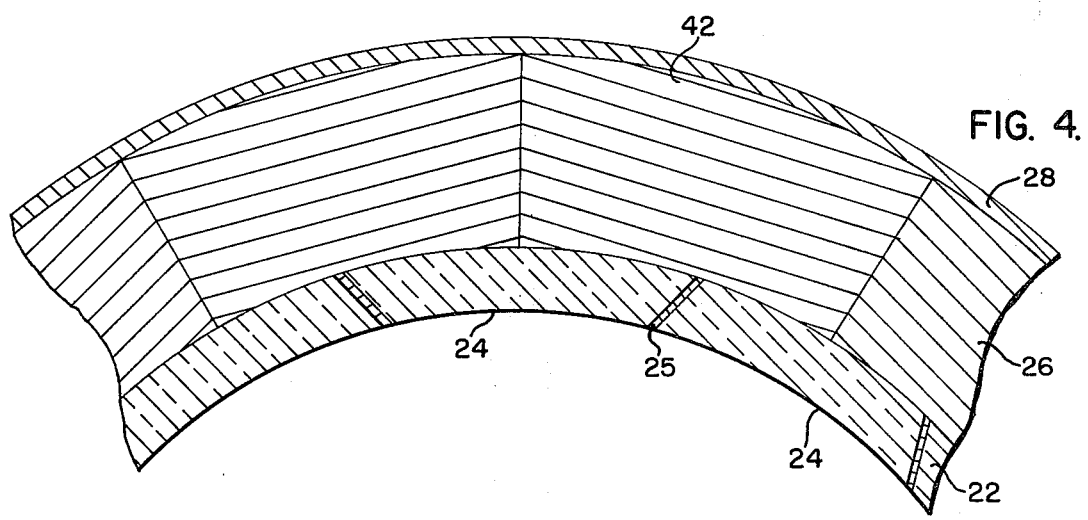
FIG. 4 is a view similar to FIG. 3, but showing yet another embodiment of the invention.

The high temperatures within the combustor 10 are stabilized by providing the combustor 10 with a high density ceramic radially innermost liner wall 22, as shown in FIG. 1. The inner liner wall 22 is constructed from a plurality of interlocking curvilear plates 24, constructed from silicon carbide SiC or silicon nitride $Si_3N_4$. The joints between adjacent interlocking or abutting plates 24 may be packed with a low density insulating material 25, as shown in FIGS. 2, 3, and 4. This low density material 25, will allow a limited expansion and displacement of the plates 24 with respect to each other.

Figure 5:
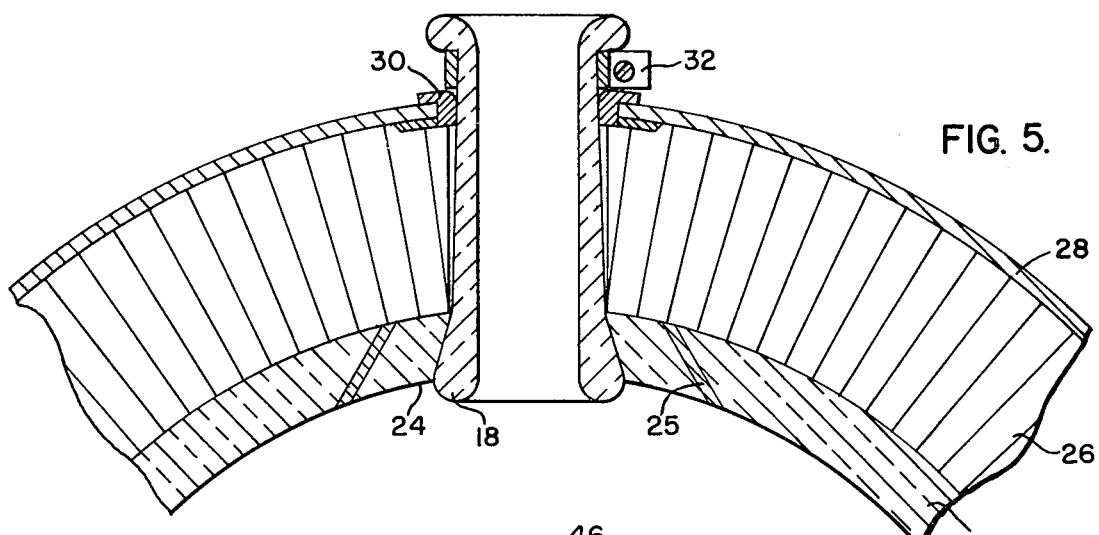
FIG. 5 is a view taken along the line V—V of FIG. 1.

An intermediate insulating liner wall 26 is disposed on the outward side of the inner liner 22. The insulating liner 26 is constructed of a low density porous ceramic material such as $Al_2O_3, ZrO_2$ or a fibrous ceramic material. An outer metal cylindrically shaped container 28 is disposed about the insulating liner wall 26. The tube-like passageways 18 and/or 20, that are disposed through the walls 22, 26 and 28, are formed from a ceramic material, and are tapered on their outside diameters, as shown in FIG. 5, to create a wedging effect between the walls 22, 26, and 28, preventing the inner walls 22, that is, the plates 24 from dislodging from their desired positions yet permitting a slight thermal expansion of the plates 24. The ceramic tube-like passageways, 18 and 20, may be tapered on their inner diameters to create a nozzle effect on the air traveling therethrough. The ceramic tube-like passageways, 18 and 20, may be disposed at the intersection of the interlocking plates 24 of the inner wall 22, for ease of manufacture and assembly, and for reduction of any stresses that may build up, within the plates 24 themselves. The ceramic tube-like passageways 18 and 20, or bushings as they are sometimes called, each may have a low density bushing 30, and clamp 32 support arrangement disposed about each of the tubes, 18 and 20, outer end, as shown in FIG. 5. The low density bushing 30 and clamp 32 prevent the displacement of the tube-like passageway 18 with respect to the outer cylindrical container 28.

An embodiment for supporting the insulating wall 26 as well as the inner wall 22, is shown in FIG. 2. In this embodiment a plurality of longitudinally disposed radially directed sheet metal ribs 34 are attached to the inside walls of the outer cylindrical container 28. The longitudinal ribs 34 are thin enough so that they will not act as major heat conductors to the outer cylindrical container 28. The plates 24 comprising the ceramic inner wall 22 are formed in a keystone manner, so as to support each other with a minimum likelihood of failure.

An alternative embodiment for the interlocking plates 24 is shown in FIG. 3. One plate 24 has a convex edge 36 and an adjacent plate 24' has a mating concave edge 38. A packing of low density material 25 between the adjacent edges, 36 and 38, allows for a slight adjustment or thermal expansion between the plates 24 and 24' and also acts as an insulator within the joints, as explained earlier.

A honeycomb arrangement 40, as also shown in FIG. 3, may be filled with a foamed zirconium oxide $ZrO_2$, or other low density insulation, to comprise the insulating intermediate wall 26. The honeycomb arrangement 40 is bonded to the inner wall portion of the container 28, yet the honeycomb arrangement 40 is still supported by the tube-like passageways 18 as described earlier.

Another embodiment of the insulating wall 26 comprises the use of arcuate plates 42 made from a pyroceramic material known commercially as Cercor, as shown in FIG. 4. The ceramic walls 22 and 26, are secured to the outer cylinder 28 by penetration of and registration with the air passageway tubes 18.

Figure 6:
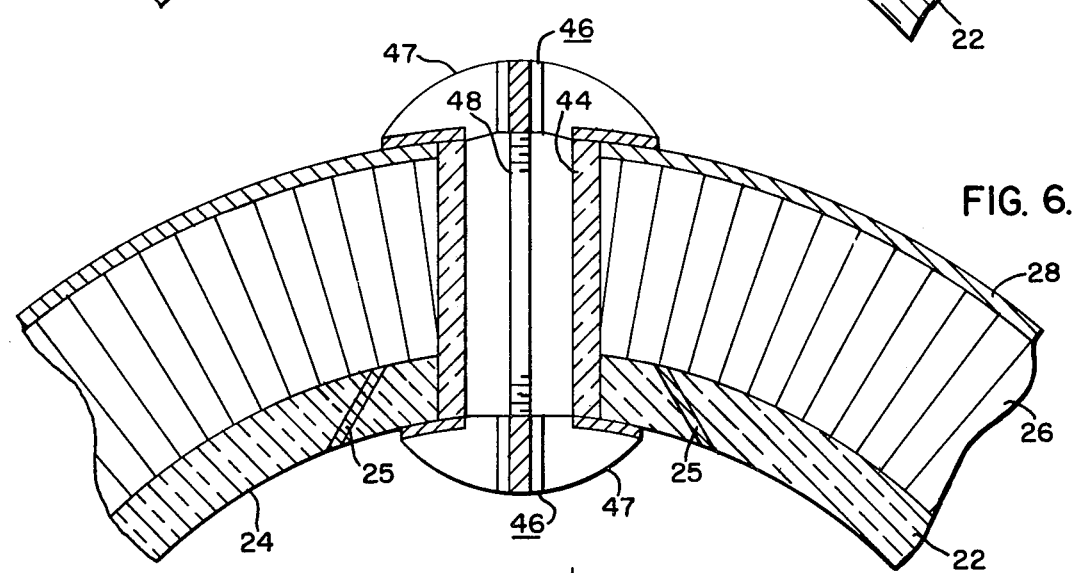
FIG. 6 is a view similar to FIG. 5, but showing a further embodiment of the invention.
Figure 7:
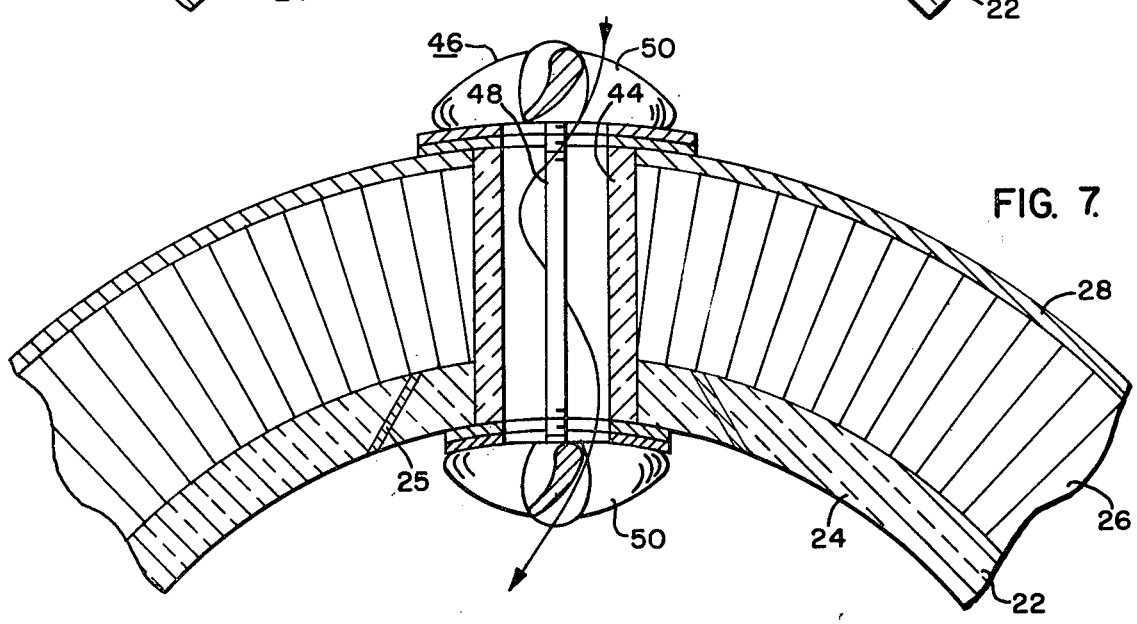
FIG. 7 is a view similar to FIG. 5, but showing yet another embodiment of the invention.

An alternative embodiment to the ceramic wedging air passageway tubes 18 is shown in FIG. 6, wherein a uniform ceramic air passageway tube 44 has a spider nut 46 upon each end. The spider nut 46 has linear arms 47 that stretch across and overhang beyond the outside edges on each end of the tube 44 to engage with the inner and outer walls, 22 and 28, of the combustor 10. The spider nut 46 at each end of each tube 44 is threaded onto a common tie rod 48 connected between them. The air flowing through the tube 44 cools the tie rod 48 and prevents the heat from damaging the rod 48. The spider nut 46, in an alternative embodiment shown in FIG. 7, has air foils 50 instead of the linear arms 47. The air foils 50 create a swirling effect to the air as it passes through the air passageway wall supporting tubes 44, providing greater penetration to the air diluting the hot motive fluid, and causing a more uniform heat pattern across the combustor outlet 11.

Figure 8:
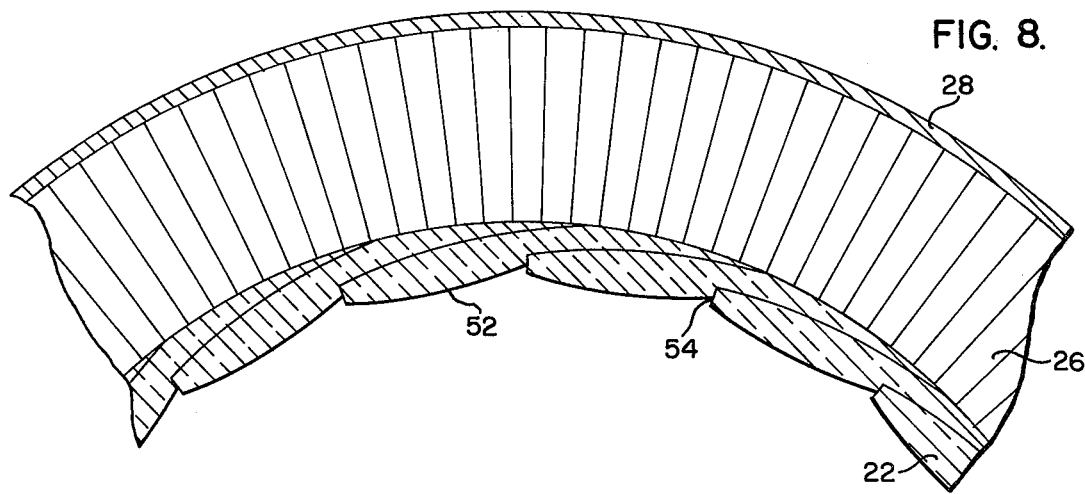
FIG. 8 is a view similar to FIG. 3, but showing another embodiment of the invention.

The inner wall 22 may be formed from a plurality of curved interlocking ceramic shingles 52, as shown in FIG. 8. The shingles 52 are retained in position by the ceramic tubes 18 as shown in FIG. 5. Each shingle 52 has a ridge 54 which provides a ledge to engage an adjacent shingle 52 and prevent its dislocation. The manufacture of this wall 22 of shingles 52 comprises cementing the shingles 52 to a stiff paper cylinder, and assembling the remaining portions of the combustor 10 over the assembled shingles 52. The stiff paper cylinder would then be burned out in a furnace.

Figure 9:
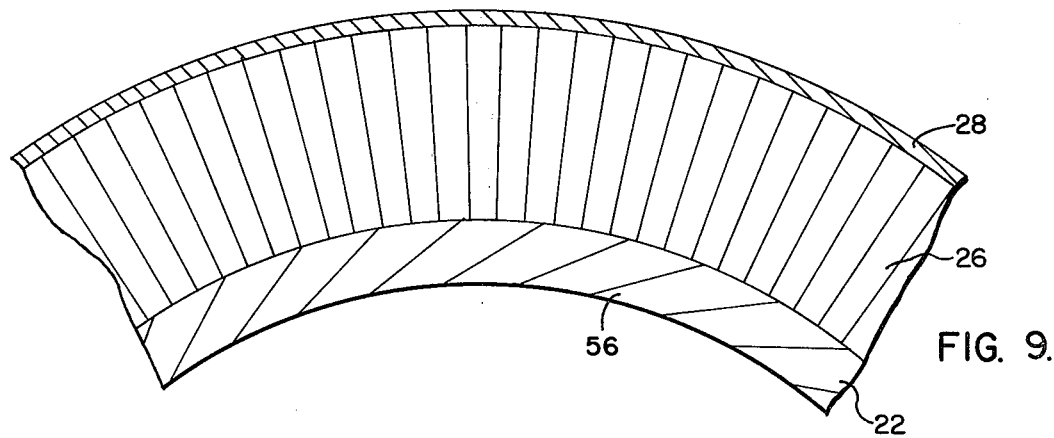
FIG. 9 is a view similar to FIG. 3, showing yet another embodiment of the invention.

As shown in FIG. 9, a high density wedge 56 arrangement could be fabricated, similar to that shown in FIG. 8. The wedges 56, however, are almost in the shape of a parallelogram. One edge is slightly longer than its corresponding parallel edge, thus providing the wedging action when disposed in the cylindrically shaped inner wall 22.

The high density ceramic materials comprising the inner walls 22 provide a hot incandescent wall for flame stability while also providing for structural integrity. The intermediate wall 26 provides the insulation required for the increased temperatures of the high efficiency high temperature turbine. The outer cylindrical container 28 is cooled by the normal ambient compressed air.

Although more than one embodiment has been shown it is intended that all the matter contained in the foregoing description or shown in the accompanying drawings, shall be interpreted as illustrative and not in a limiting sense.

I claim:

1. A combustion chamber for a gas turbine engine comprising; an outer cylindrical wall portion forming the outer casing of said combustion chamber, an intermediate generally cylindrical wall portion disposed radially inwardly of and adjacent said outer wall portion, an inner generally cylindrical wall portion disposed radially inwardly of and adjacent said intermediate wall portion, said inner wall portion comprising interlocking members, said interlocking members being stabilized within said chamber by a plurality of inlet air tube-like bushings, said bushings providing air passageways from the outside of said outer casing to the inside of said inner wall portions, said bushings having retaining means for keeping the inner wall portions in close relationship to the intermediate and external wall members, said bushing being constructed from a ceramic material.

2. A combustion chamber for a gas turbine engine comprising; an outer cylindrical wall portion forming the outer casing of said combustion chamber, an intermediate generally cylindrical wall portion disposed radially inwardly of and adjacent said outer wall portion, an inner generally cylindrical wall portion disposed radially inwardly of and adjacent said intermediate wall portion, said inner wall portion comprising interlocking members, said interlocking members being stabilized within said chamber by a plurality of inlet air tube-like bushings, said bushings providing air passageways from the outside of said casing to the inside of said inner wall portions, said bushings having retaining means for keeping the inner wall portions in close relationship to the intermediate and external wall members, said intermediate wall comprises a honeycomb structure, said honeycomb structure being attached to the inner side of the outer wall member, said honeycomb structure being filled with a low density refractory insulator material.

3. A combustion chamber for a gas turbine engine as recited in claim 2, wherein said retaining means on said bushings comprises a tapered outer diameter on said bushing, said taper supporting the inner refractory interlocking members.

4. A combustion chamber for a gas turbine engine as recited in claim 2, wherein said retaining means comprises a spider nut on each end of said bushing, each of said spider nuts being in supporting contact with said adjacent wall members, said spider nuts preventing damaging dislocation of the inner wall members with respect to the outer wall member.

5. A combustion chamber for a gas turbine engine as recited in claim 4, wherein the arms on said spider nut have an air foil configuration to give the air passing through said tube-like passageways in said bushing a swirling motion, which penetrates the innermost combustion gases and provides added turbulence to the gases within the combustion chamber.

* * * * *